Dec. 4, 1956 — A. MAIER ET AL — 2,772,581
TRANSMISSION FOR MOTOR VEHICLES
Filed Feb. 5, 1952 — 2 Sheets-Sheet 1

Inventors:
ALBERT MAIER, OTTO SCHWAB &
JULIUS KIECHLE

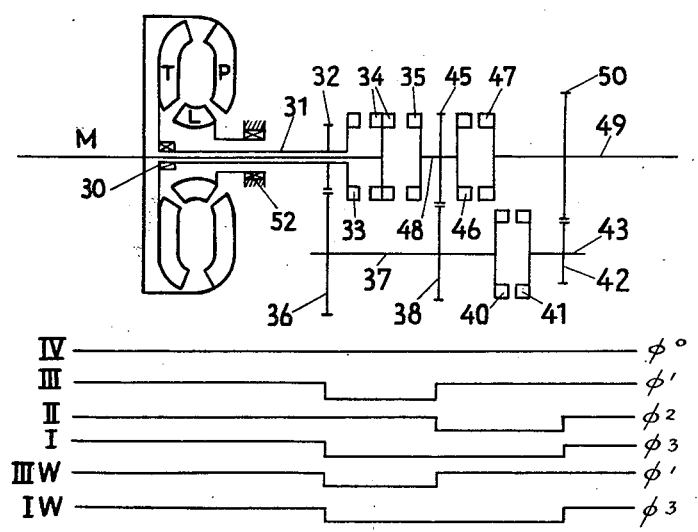
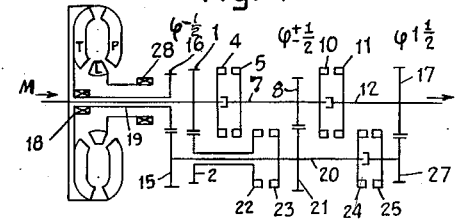

United States Patent Office 2,772,581
Patented Dec. 4, 1956

2,772,581

TRANSMISSION FOR MOTOR VEHICLES

Albert Maier, Otto Schwab, and Julius Kiechle, Friedrichshafen am Boden See, Germany, assignors to Zahnradfabrik Friedrichshafen Aktiengesellschaft, Friedrichshafen am Boden See, Germany Application February 5, 1952, Serial No. 270,066

Claims priority, application Germany February 10, 1951

8 Claims. (Cl. 74—732)

This invention relates to a power transmission for motor vehicles consisting of a hydraulic torque converter and a change speed gear, in which is made use of non-positive clutches—preferably friction clutches—or of synchronisable positive clutches for gear shifting.

One of the objects of the invention is to provide a novel construction of a driving installation of the aforesaid kind, whereby especially the change gear and its operative connection with the torque converter has been improved. Thereby the construction of the change speed gear is more simplified and considerable advantages are gained, which are of great value in operational travel of all types of motor vehicles. Under all conditions of road and travel the available driving power is most favourably utilised. The driver is free to use his judgment in utilising the infinitely variable torque converter for starting off and for all conditions of travel and can make full use of the advantage of the torque converter.

If it appears necessary to the driver, he can at any time optionally go over to the use of the stepped shift gear alone, for the purpose of negotiating all up or down grades on that gear, thus obtaining the advantage that when negotiating steep rises the high efficiency of the stepped shift gear may always be available. A particularly important advantage of the propulsion plant according to the invention consists in that the engine can be used to brake the vehicle when travelling downhill. In addition, it is possible to start the engine by towing the vehicle without any difficulty. In order to ensure that the vehicle shall not run away when at rest, a suitable connection may be made between the engine and the wheel axle to be driven. The change-over from individual use of the converter with individual gear speeds to utilisation of the stepped shift gear alone is made without interruption of tractive power.

In order that the invention may be more readily understood, reference is made to the accompanying drawings which illustrate diagrammatically and by way of example two embodiments of driving installation according to the invention, together with diagrams depicting passage through the individual gear speeds with and without the use of the torque converter, and in which:

Figure 1 shows a fluid gear acting as torque converter, and associated therewith a change-speed gear furnished with non-positive, preferably friction clutches, or with synchronisable positive shift clutches, in a multi-group construction, for the purpose of obtaining four forward speeds. This installation is particularly suitable for omnibuses. Associated with Figure 1 is the shift diagram for the normal gear speeds and for two further gear speeds with converter operation;

Figure 3 shows another embodiment of plant and the appertaining diagram shows the passage through the various gear speeds with and without the use of the torque converter.

Fig. 4 illustrates a further embodiment of the invention.

Figure 1:
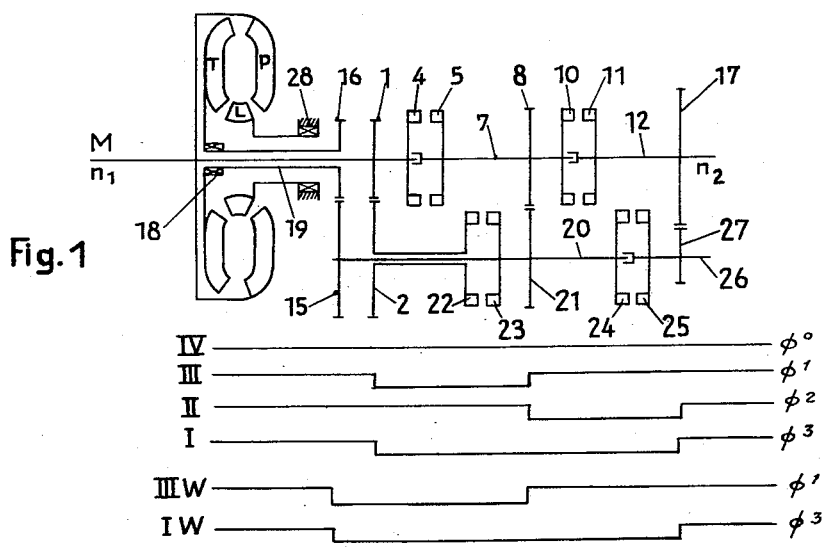

Referring to Figure 1, the engine shaft M has keyed on to it the pump wheel P of a fluid gear constituting a torque converter and a wheel 1 (on the engine side) of a pair of wheels 1, 2 for transmission without the converter. Following the wheel 1 is a shift clutch 4, 5, one part 5 of which is mounted on a transmission shaft 7, which also carries a fixed wheel 8 and half of a shift clutch 10, 11. The other half 11 of the latter shift clutch is mounted fast on a transmission shaft 12, which also carries a wheel 17. The turbine wheel T of the converter carries a wheel 16 (on the engine side) of a second pair of wheels 15, 16, for transmission with the converter, with the interposition of a one-way overrunning clutch 18 and a hollow shaft 19. The co-acting wheel 15 is mounted on a countershaft 20. Keyed to the shaft 20 is a wheel 21 coacting with the wheel 8 of the main shaft train and in addition the halves 23 and 24 of each of two shift clutches 22, 23 and 24, 25. The shift clutch half 22 is combined with the co-acting wheel 2 of the first pair of wheels. The shift clutch half 25 is mounted on a countershaft 26, which carries a wheel keyed on it a wheel 27 coacting with the wheel 17 of the shaft 12 on the transmission side. The guide wheel L of the converter is mounted in the stationary housing with the interposition of a one-way overrunning brake 28. In accordance with this embodiment of the transmission, it is possible to accommodate the gear shift clutches 4, 5 and 22, 23 in such a manner as to save space, so that the gear is of particularly compact construction.

If it is desired to run without using the converter, the shift clutch 22, 23 is closed, so that the shaft 19 of the turbine wheel T is coupled to the engine or pump shaft M which carries the wheel 1. Power is therefore transmitted from the engine direct to both the clutch part 4 and to the countershaft 20, without using the torque converter. Since no counter-torque is then applied to the guide wheel L, the latter can freely turn in consequence of its mounting on the stationary housing, through the one-way brake 28. In the second and third gear speeds the hollow shaft 19 is turned more quickly, through the pair of wheels 8, 21, than the engine shaft, in consequence of the presence of the freewheel 18. The turbine wheel T is merely driven by the flow of fluid, while its speed is reduced and approximately equals the speed of the engine or pump wheel.

It is therefore apparent that the present invention consists in a power transmission which comprises torque converter means including impeller means P and turbine wheel means T; drive shaft means M driving the impeller means P; a driven shaft means 20 connected to the turbine wheel means T for rotation; releasable clutch means 22, 23 for connecting said drive shaft means M with the driven shaft means 20 and being movable between a releasing position in which the torque converter means is operative and said turbine wheel means T drives the driven shaft means 20, and a closed position in which the driven shaft means 20 is driven from the drive shaft means M; an output shaft 12; first gear transmission means 17, 27, including a first releasable clutch 24, 25 connecting the driven shaft means 20 with the output shaft 12; a transmission shaft 7; second gear transmission means 21, 8 connecting the driven shaft means 20 with the transmission shaft 7; a second releasable clutch 10, 11 connecting the transmission shaft 7 with the output shaft 12; and a third clutch 4, 5 for connecting the transmission shaft 7 with the drive shaft M and constituting in combination with said first and second transmission gear means 17, 27—21, 8 and said first clutch 24, 25 a further gear stage, and in combination with the second clutch 10, 11 a direct drive means.

Figure 2:
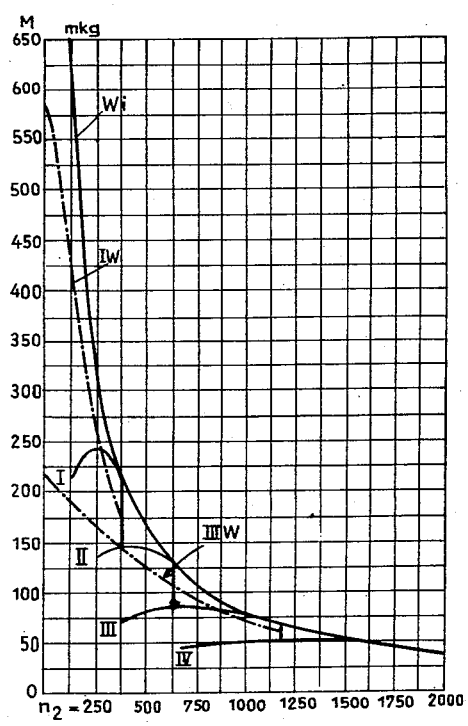
Figure 2 shows the lines of tractive force of such a gear and the resulting torque increase for selected speeds of the transmission.

Figure 2 shows the tractive force diagram of a converter gear of this type. On the left, vertically, are indicated the values of the torque M of the transmission shaft, while horizontally are shown the speed values $n_2$ of the transmission shaft. $W_1$ is the ideal line of tractive force of a converter with 100% efficiency, and IW and IIIW are its actual lines of tractive force when using the first and third gear speeds. The diagrams of the various gear speeds are designated by I, II, III, and IV.

In the embodiment illustrated in Figure 3, the turbine part T is mounted on a hollow shaft 31, with the interposition of a one-way clutch 30. Keyed to the hollow shaft 31 is a gear wheel 32 and one part 33 of a double shift clutch 33, 34, 35. A wheel 36 coacting with the wheel 32 is mounted on a countershaft 37, which has also keyed to it a wheel 38 and one half 40 of a shift clutch 40, 41. The other half 41 of this shift clutch is fast on a shaft 43 together with a wheel 42. The centre part 34 of the double clutch 33, 34, 35 is secured on the engine shaft M, which carries the pump part P of the converter. The clutch part 35 is mounted, together with a wheel 45 and one half 46 of a clutch 46, 47, on a shaft 48. The clutch half 47 is keyed to the transmission shaft 49, which also carries a wheel 50. The construction illustrated in Figure 3 permits one pair of wheels to be saved. Here the engine or pump shaft M and the hollow shaft 31 are short-circuited by operating the clutch 33, 34. Otherwise, the mode of operation is exactly as in the case of the example illustrated in Figure 1. The guide wheel L of the converter is mounted in the stationary housing with the interposition of a freewheel one-way brake 52.

Certain structural alterations are advantageous in order to compensate for the slip which experience has shown to occur in the driving of the stepwise shifted gear through the converter, said slip having the result that the maximum speed of the turbine wheel cannot quite achieve the speed of the pump wheel when loaded. According to the invention this equalization is rendered possible by correction of the gear ratio in the transmission from the converter output to the gear input shaft, the gear wheels having such dimensions that the divergence between the gear ratios in the transmission from the turbine wheel to the change speed gear and in the transmission from the engine (pump wheel) to the change speed gear corresponds substantially to the above-mentioned slip between the turbine wheel at maximum speed and full load and the pump wheel. The effect is thus achieved that the maximum full load speeds of the output shaft of the transmission when operating with the aid of the converter are equal to the corresponding speeds in operation when the converter is not used.

By bringing the converter into operation, the input torque of the change speed gear is brought to a multiple of the engine torque. Assuming that $n_\mathrm{I}$, $n_\mathrm{II}$, $n_\mathrm{III}$, and $n_\mathrm{IV}$ are the revolutions per minute of the output shaft 12 (49) in the four gear stages of the transmission, the quotients $$\frac{n_I}{n_I}, \frac{n_{III}}{n_{II}}, \frac{n_{IV}}{n_{III}}$$

constitute the "progressive ratio" $\phi$. The final speeds of the gear stages follow a geometrical progression. In order then to avoid the heavier construction corresponding to the higher torque, the change speed gear of the present invention is built as a so-called overdrive, that means that the overall ratios in the different speeds of the gear are all reduced by the value $\phi$, said ratios being powers of the progressive ratio $\phi$ and forming a geometric progression, for example:

| gear stage | overall ratio |
| --- | --- |
| I. speed | $\phi^3$ |
| II. speed | $\phi^2$ |
| III. speed | $\phi^1$ |
| IV. speed | $\phi^0$ = (direct drive) | wherein $\phi$ is a value greater than one.

By reducing the above overall ratios by the value $\phi$, the following overdrive progression of the overall ratios results:

I.        speed $\frac{n_\mathrm{motor}}{n_\mathrm{I}} = \phi^2$

II.       speed $\frac{n_\mathrm{motor}}{n_\mathrm{II}} = \phi^1$

III.     speed $\frac{n_\mathrm{motor}}{n_\mathrm{III}} = \phi^0 =$ (direct drive)

IV.     speed $\frac{n_\mathrm{motor}}{n_\mathrm{IV}} = \phi^{-1}$ (overdrive)

In the transmission of torque from the change-speed gear to the vehicle wheel axle, however the overall ratio is incresed by means of a reduction group gear by the above-mentioned value $\phi$. In the four-speed gear construction illustrated in Fig. 1, for example, in order to gain the above-cited overdrive progression the values $\phi^{-1}$, $\phi^0$, $\phi^2$ would be provided instead of the values $\phi^1$, $\phi^0$, $\phi^2$ for the ratios of the three pairs of wheels to be driven direct by the engine.

In order to prevent the pinion of the last pair of wheels (having the ratio $\phi^2$) from receiving too high a speed of rotation, according to the invention the three values are so altered, while retaining the overall ratios, that the value for the last pair of wheels is smaller than $\phi^2$; for example the values are made at $\phi^{-1/2}$, $\phi^{\mp 1/2}$, $\phi^{1\,1/2}$.

Fig. 4 illustrates a modified embodiment of the invention. It shows a four-speed gear transmission, in which the gear wheels of the various gear stages appear in the correct dimensional proportions with respect to one another.

The pump wheel P and the pinion 1 are driven by the engine (not shown), and the turbine wheel T is also driven from the impeller wheel P through the guide wheel L. The turbine wheel T drives the pinion 16 through the one-way coupling 18. At full load and maximum speed $n_\mathrm{motor}$ of the engine, the speed $n_\mathrm{T}$ of the turbine wheel is smaller by a predetermined amount than the engine speed $n_\mathrm{motor}$, and slip occurs. When the pinion 16 is driven directly, it runs at the engine speed $n_\mathrm{motor}$. The transmission ratios of the wheel pairs 1, 2 and 16, 15 are according to the invention so adjusted that the difference between $n_\mathrm{motor}$ and $n_\mathrm{T}$ is balanced and the revolutions per minute of the output shaft 12 in the speed I without converter equals the revolutions per minute in the corresponding speed I+$W$ with converter at maximum speed and full load, and the revolutions per minute of shaft 12 in the speed II equals that in the corresponding speed III+$W$ at maximum speed and full load. The indices W indicate that the respective speeds are obtained while the converter is operative.

$$n_\mathrm{I} = n_{\mathrm{I}+W}, \quad n_\mathrm{III} = n_{\mathrm{III}+W}$$

Thus, both series of revolutions per minute of the output shaft 12:

$$n_\mathrm{I}, n_\mathrm{II}, n_\mathrm{III}, n_\mathrm{IV},$$

and $$n_{\mathrm{I}+W}, n_\mathrm{II}, n_{\mathrm{III}+W}, n_\mathrm{IV}$$

are graduated in a geometric progression, which grant certain advantages in driving and gear shifting of a vehicle.

In one embodiment of the invention the ratios of the revolutions per minute of the wheel pairs of the change-speed gear are:

$$\frac{n_1}{n_2} = \phi^1; \quad \frac{n_8}{n_{21}} = \phi^0 = 1; \quad \frac{n_{27}}{n_{17}} = \phi^2$$

wherein $n_2$, $n_1$ are the revolutions per minute of the wheels 2, 1 and $\phi$ is the progressive ratio, that is the quotient of the revolutions per minute values of the output shaft 12 in two adjacent speeds, $$\frac{n_{II}}{n_I}, \frac{n_{III}}{n_{II}} \text{ and } \frac{n_{IV}}{n_{III}}$$

If, as in the present invention, the revolutions per minute of shaft 12 in the different speeds form a geometric progression, then $$\frac{n_{II}}{n_I} = \frac{n_{III}}{n_{II}} = \frac{n_{IV}}{n_{III}} = \phi$$

With normal graduation of the individual gear stages by the progressive ratio $\phi$ greater than 1 and direct drive in the fourth speed, the total ratios in the four gear speeds formed without the use of the converter would be:

I. speed (gear pairs 1, 2 and 27, 17)

$$\frac{n_{motor}}{n_I} = \frac{n_1}{n_2} \cdot \frac{n_{27}}{n_{17}} = \phi^1 \cdot \phi^2 = \phi^3$$

II. speed (gear pairs 8, 21 and 27, 17)

$$\frac{n_{motor}}{n_{II}} = \frac{n_8}{n_{21}} \cdot \frac{n_{27}}{n_{17}} = \phi^0 \cdot \phi^2 = \phi^2$$

III. speed (gear pairs 1, 2 and 21, 8)

$$\frac{n_{motor}}{n_{III}} = \phi^1 \cdot \phi^0 = \phi^1$$

IV. speed (direct drive)

$$\frac{n_{motor}}{n_{IV}} = \phi^0 = 1$$

In order to realize the above-mentioned compensation of the slip between pump wheel P and turbine wheel T, the following conditions must be fulfilled:

$$\frac{n_{motor}}{n_{I+W}} = \phi^3; \quad \frac{n_{motor}}{n_{III+W}} = \phi^1$$

$$\frac{n_{motor}}{n_T} = S \text{ (slip)}$$

The total ratio in the speed $I+W$ with converter is:

$$S \cdot \frac{n_{16}}{n_{15}} \cdot \frac{n_{27}}{n_{17}} = \phi^3$$

from which results:

$$\frac{n_{16}}{n_{15}} = \frac{\phi^3}{S \cdot \frac{n_{27}}{n_{17}}}$$

With $S=1.25$ and $\phi=1.58$ for example $$\frac{n_{16}}{n_{15}} = \frac{1.56^3}{1.25 \cdot \phi^2} = \frac{1.56}{1.25} = 1.25$$

that means: the ratio of the wheel pair 16, 15 equals the slip S.

The total ratio of speed IIIw with converter results to:

$$S \cdot \frac{n_{16}}{n_{15}} \cdot \frac{n_{21}}{n_8} = \phi^1$$

$$1.25 \cdot 1.25 \cdot 1 = 1.56 = \phi^1$$

Thus, the ratio $$\frac{n_{16}}{n_{15}} = S$$

results to give the desired values of the corresponding overall ratios.

According to the invention the total ratio in each gear speed should for example be reduced by $\phi$. To this end the three values $\phi^{-1}$, $\phi^0$ and $\phi^2$ would be provided as the transmission ratios for the wheel pairs $$\frac{n_1}{n_2}, \frac{n_8}{n_{21}} \text{ and } \frac{n_{27}}{n_{17}}$$

instead of the values $\phi^1$, $\phi^0$ and $\phi^2$ provided in the embodiment mentioned herebefore.

Thus, the following transmission ratios are obtained:

I. speed (gear pairs 8, 21 and 27, 17)

$$\frac{n_{motor}}{n_I} = \frac{n_8}{n_{21}} \cdot \frac{n_{27}}{n_{17}} = \phi^0 \cdot \phi^2 = \phi^2$$

II. speed (gear pairs 1, 2 and 27, 17)

$$\frac{n_{motor}}{n_I} = \frac{n_1}{n_2} \cdot \frac{n_{27}}{n_{17}} = \phi^{-1} \cdot \phi^2 = \phi^1$$

III. speed (direct drive)

$$\frac{n_{motor}}{n_{III}} = \phi^0 = 1$$

IV. speed (gear pairs 1, 2 and 21, 8)

$$\frac{n_{motor}}{n_{IV}} = \phi^{-1} \cdot \phi^0 = \phi^{-1} = \frac{1}{\phi}$$

The direct drive thus occurs in the third gear speed. The fourth gear speed gives an overdrive. By providing a reduction group gear with the transmission ratio $\phi$ between the change-speed gear and the wheel axle of the vehicle, the total transmission ratios in the four gear speeds are increased by the factor $\phi$. Thus, the original overall transmission ratios $\phi^3$, $\phi^2$, $\phi$ and $\phi^0$ are again obtained.

The advantage obtained by the above-described gear ratios resides in that, while avoiding too high speeds of the smallest countershaft wheel, a reduction of the gear load and hence in general a reduction in the overall dimensions of the stepped gear are achieved; in fact, there is a substantial shortening of the structural length of the gear, and a reduction of the distances between axles, and of other dimensions. This advantage is of great value with regard to the most favourable accommodation of the stepped gear together with the torque converter in motor vehicles, particularly omnibuses.

We claim:

1. In a power transmission, in combination, torque converter means including impeller means and turbine wheel means; drive shaft means driving said impeller means; driven shaft means connected to said turbine wheel means for rotation; releasable clutch means for connecting said drive shaft means with said driven shaft means and being movable between a releasing position in which said torque converter means is operative and said turbine wheel drives said driven shaft means, and a closed position in which said driven shaft means are driven from said drive shaft means; an output shaft; first gear transmission means including a first releasable clutch connecting said driven shaft means with said output shaft; a transmission shaft; second gear transmission means connecting said driven shaft means with said transmission shaft; and a second releasable clutch connecting said transmission shaft means with said output shaft.

2. In a power transmission, in combination, torque converter means including impeller means and turbine wheel means; drive shaft means driving said impeller means; driven shaft means connected to said turbine wheel means for rotation; releasable clutch means for connecting said drive shaft means with said driven shaft means and being movable between a releasing position in which said torque converter means is operative and said turbine wheel drives said driven shaft means, and a closed position in which said driven shaft means are driven from said drive shaft means; an output shaft; first gear transmission means including a first releasable clutch connecting said driven shaft means with said output shaft; a transmission shaft; second gear transmission means connecting said driven shaft means with said transmission shaft; a second releasable clutch connecting said transmission shaft means with said output shaft; and a third clutch for connecting said transmission shaft with said drive shaft and constituting in combination with said first and second transmission gear means and said first clutch a further gear stage, and in combination with said second clutch a direct drive means.

3. A transmission as set forth in claim 2 wherein said drive shaft means includes an engine drive shaft aligned with said transmission shaft; wherein said driven shaft means includes a hollow shaft surrounding said engine drive shaft, a countershaft, and a pair of meshing gears, one of said gears being secured to said hollow shaft and the other gear being secured to said countershaft; and wherein said releasable clutch means has two clutch members, one of said clutch members being secured to said counter shaft and the other of said clutch members being connected to said drive shaft means.

4. A transmission as set forth in claim 3 wherein said first gear transmission means includes a pair of meshing gears, one of said meshing gears being secured to said output shaft and the other of said gears being secured to said first clutch.

5. A transmission as set forth in claim 2 wherein said drive shaft means includes an engine drive shaft aligned with said transmission shaft; wherein said driven shaft means includes a hollow shaft surrounding said engine drive shaft, a counter shaft, and a pair of meshing gears, one of said gears being secured to said hollow shaft and the other gear being secured to said counter shaft; wherein said releasable clutch means and said third clutch are combined to constitute a double shift clutch, said double shift clutch having a first clutch member secured to said transmission shaft, a second clutch member secured to said hollow shaft, and a third clutch member located between said first and second clutch members and secured to said drive shaft, said third clutch member being shiftable and selectively engageable with said first and second clutch members; and wherein said first gear transmission means includes a pair of meshing gears, one of said meshing gears being secured to said output shaft and the other of said gears being secured to said first clutch.

6. A transmission as set forth in claim 4 wherein said pairs of meshing gears constitute a change speed gear having a plurality of forward gear stages, the overall ratios of said gear stages being powers of the progressive ratio $\phi$ and forming a geometric progression, said change speed gear being a group gear of the overdrive type, one gear of said pairs of gears being the smallest gear of said overdrive group gear and being mounted on said counter shaft, the exponent of the transmission ratio of the pair of gears including said one gear being reduced in relation to the exponent of the maximum ratio of the overdrive group gear, while the overall ratios of the forward gear stages of said overdrive group gear are retained.

7. A transmission as set forth in claim 6 wherein said change speed gear has three pairs of gears wherein the overall ratios of the gears are retained and wherein the ratio of the third pair of said pairs of gears having the maximum ratio is smaller than $\phi^2$, and the transmission ratios of the three pairs of gears are such powers of the progressive ratio $\phi$ that the total of the exponents of the first and second pair of gears equals $-1$, the total of exponents of the first and third pairs of gears equal $+1$, and the total of the negative exponent of the second pair of gears and of the exponent of the third pair of wheels equals 2.

8. A transmission according to claim 7, wherein the maximum transmission ratio of said third pair of gears is $\phi^{1\,1/2}$, the transmission ratio of the other two of said pairs of gears being $\phi^{-1/2}$ and $\phi^{\pm 1/2}$, so that the total of the exponents of the first and second pair of gears equals $-\frac{1}{2}-\frac{1}{2}=-1$ so that the fourth speed overall ratio is $\phi^{-1}$, the total of the exponents of the first and third wheel pair equals $-\frac{1}{2}+1\frac{1}{2}=1$ so that the second speed overall ratio is $\phi^1$, and the total of the positive exponent of the second wheel pair and of the exponent of the third wheel pair equals $\frac{1}{2}+1\frac{1}{2}=2$ so that the first speed overall ratio is $\phi^2$.

References Cited in the file of this patent

UNITED STATES PATENTS

| | | |
|---|---|---|
| 2,084,219 | Salerni | June 15, 1937 |
| 2,226,802 | Black | Dec. 31, 1940 |
| 2,355,709 | Dodge | Aug. 15, 1944 |
| 2,368,801 | Carnagua | Feb. 6, 1945 |
| 2,449,608 | Le May | Sept. 21, 1948 |
| 2,499,128 | Brunken | Feb. 28, 1950 |
| 2,519,080 | Simpson | Aug. 15, 1950 |
| 2,567,446 | Polomski | Sept. 11, 1951 |